United States Patent
Atkinson et al.

(10) Patent No.: US 11,508,073 B2
(45) Date of Patent: Nov. 22, 2022

(54) METHOD FOR DETERMINING ANGLE OF TIPS OF RIPPER SHANKS IN DOZER MACHINES

(71) Applicant: Caterpillar Inc., Peoria, IL (US)

(72) Inventors: David Conway Atkinson, Dunlap, IL (US); Nolan Finch, Durango, CO (US)

(73) Assignee: Caterpillar Inc., Peoria, IL (US)

( * ) Notice: Subject to any disclaimer, the term of this patent is extended or adjusted under 35 U.S.C. 154(b) by 46 days.

(21) Appl. No.: 17/226,346

(22) Filed: Apr. 9, 2021

(65) Prior Publication Data

US 2022/0327715 A1    Oct. 13, 2022

(51) Int. Cl.
| | |
|---|---|
| G06K 9/00 | (2022.01) |
| G06T 7/246 | (2017.01) |
| G06K 9/62 | (2022.01) |
| G06T 7/60 | (2017.01) |
| G06V 10/56 | (2022.01) |
| G06V 20/40 | (2022.01) |

(52) U.S. Cl.
CPC ............ *G06T 7/246* (2017.01); *G06K 9/6215* (2013.01); *G06T 7/60* (2013.01); *G06V 10/56* (2022.01); *G06V 20/40* (2022.01); *G06T 2207/10016* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 7,865,285 B2 | 1/2011 | Price et al. | |
| 9,014,925 B2 | 4/2015 | Clar et al. | |
| 9,139,977 B2 | 9/2015 | McCain et al. | |
| 10,132,060 B2 | 11/2018 | Forcash et al. | |
| 10,163,033 B2 * | 12/2018 | Mianzo | ...................... G06T 7/75 |
| 10,233,615 B2 | 3/2019 | Yamaguchi et al. | |
| 10,519,631 B2 * | 12/2019 | Forcash | ............... G06V 10/245 |
| 2011/0169949 A1 * | 7/2011 | McCain | .................. E02F 3/847 348/148 |
| 2020/0362539 A1 * | 11/2020 | Plouzek | .................. E02F 9/264 |

* cited by examiner

*Primary Examiner* — Soo Jin Park (57) ABSTRACT

A method for determining an angle of a tip of a ripper shank includes a controller receiving an input command. The controller estimates an angle of the tip based on one or more parameters of the input command. Further, the controller acquires a video feed of the ripper shank and detects an object in the video feed. The controller identifies the object as one of the ripper shank or a component movable with a movement of the ripper shank based on a match of a color of the object to a predefined color and a match of a profile of the object to a predefined profile. The controller co-relates the profile to an angular value in a map table and sets the angular value to be an actual angle of the tip over the angle of the tip estimated based on the input command.

1 Claim, 7 Drawing Sheets

| OBJECT PROFILE | ANGULAR VALUE |
|---|---|
| 236 ▮ | 40 DEGREES |
| ⋮ | ⋮ |
| 236 ▮ | 60 DEGREES |
| ⋮ | ⋮ |
| 236 ▮ | 80 DEGREES |

METHOD FOR DETERMINING ANGLE OF TIPS OF RIPPER SHANKS IN DOZER MACHINES

TECHNICAL FIELD

The present disclosure relates to a dozer machine having a ripper shank. More particularly, the present disclosure relates to a method for determining an angle of a tip of the ripper shank based on an input signal and a video feed.

BACKGROUND

Machines applicable in road construction and in mining environment, such as dozer machines, are widely used to alter a ground surface and/or to break up underlying rock formations. In this regard, such machines generally use a ripper assembly that has a ripper shank with a replaceable shank tip. During operation, the ripper assembly is lowered to engage the material at and below the ground surface. The machine is then moved so that along with the movement of the machine, the shank tip may penetrate rock causing the rock to fracture. Once the rock is fractured, fractured rock fragments can easily be moved with a front blade of the machine.

The quality of such an operation depends to a large extent on the angle and depth at which the shank tip engages the rock. Monitoring the depth of the shank tip is generally straight forward. However, monitoring the angle at which the shank tip attacks the rock is difficult. This is partly because the shank tip is underground, and an operator cannot actually see the shank tip. To monitor depths of the ripper shank/tip, suitable sensors are commonly mounted to the ripper frame to estimate depth based on the angle of the ripper frame. However, monitoring an angle of the shank tip is difficult due to vibrations encountered during operations that may misposition the sensors, shorten the life of the sensors, or altogether damage the sensors, and which may in turn lead to machine downtime and decreased productivity.

U.S. Pat. No. 9,139,977 relates to a system for determining an orientation of an implement on a vehicle. The system includes a camera mounted to the vehicle and a target object within a field of vision of the camera and mounted to the implement. The target object includes markings to enable a determination of the orientation of the implement with respect to the camera.

SUMMARY OF THE INVENTION

In one aspect, the disclosure is directed to a method for determining an angle of a tip of a ripper shank in a dozer machine. The method includes receiving, by a controller, an input command and estimating, by the controller, an angle of the tip based on one or more parameters of the input command. Further, the method includes the controller acquiring a video feed of the ripper shank captured by one or more image capturing devices in response to the input command. The controller detects one or more objects in the video feed and identifies at least one object as one of the ripper shank or a component movable with a movement of the ripper shank based on a match of a color of the object to a predefined color and a match of a profile of the object to a predefined profile. Further, the controller co-relates the profile to an angular value in a map table. The map table includes a number of angular values corresponding to a number of profiles of the object. The controller sets the angular value obtained by co-relating the profile in the map table to be an actual angle of the tip over the angle of the tip estimated based on the input command.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts.

Figure 1:
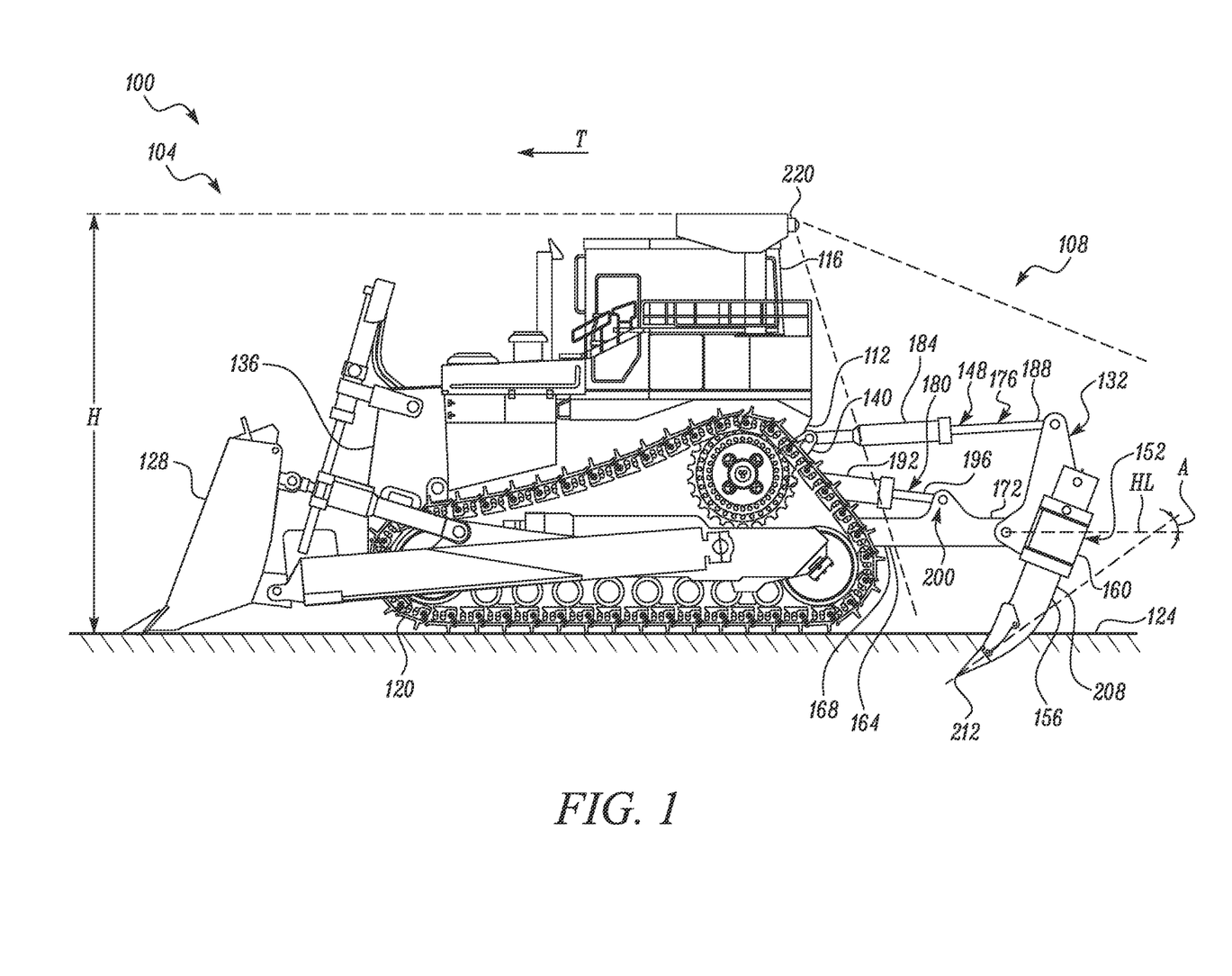
FIG. 1 is a side view of a machine having a ripper assembly positioned in an operational position, in accordance with an aspect of the present disclosure.
Figure 2:
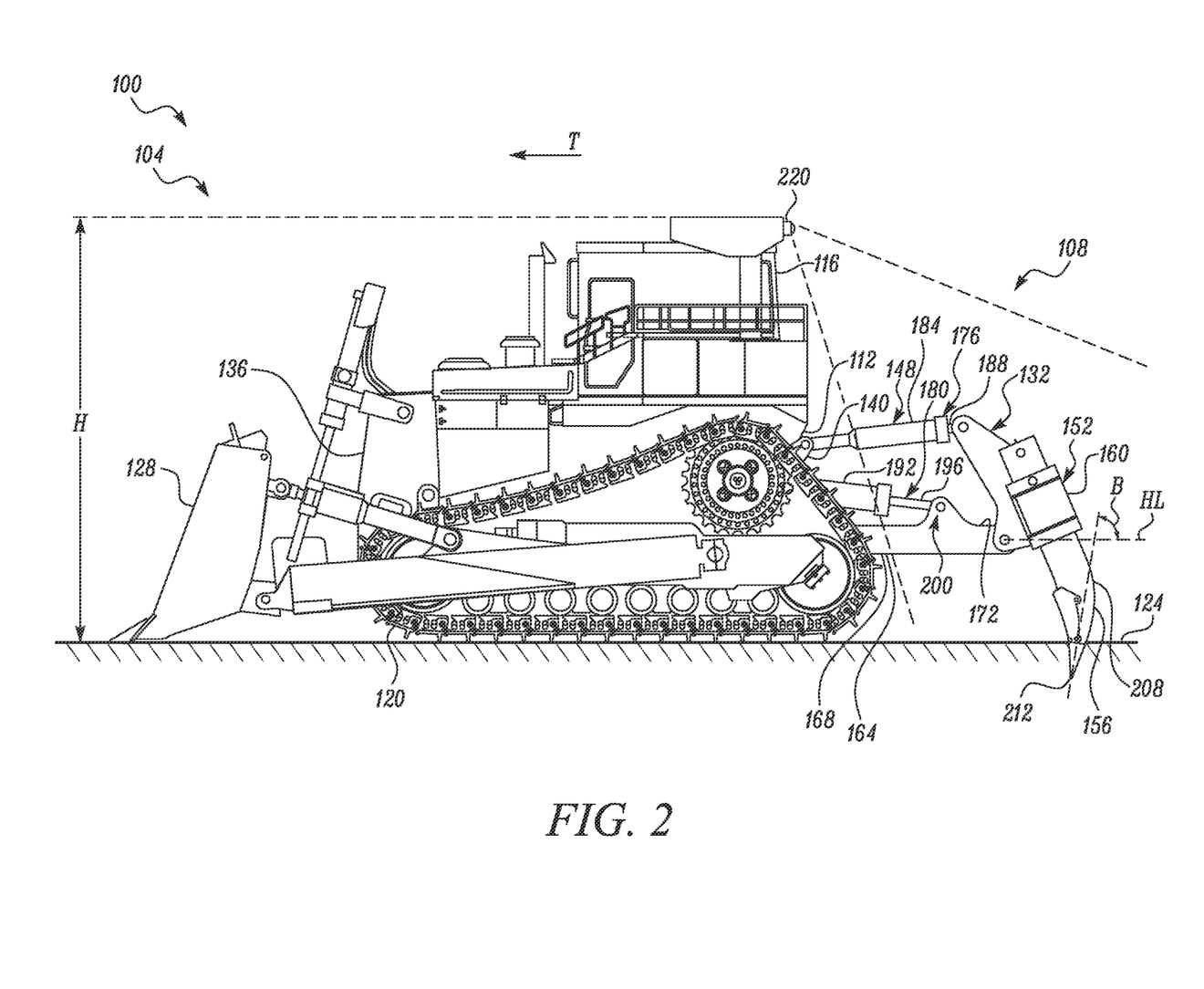
FIG. 2 is a side view of the machine having the ripper assembly positioned in another operational position, in accordance with an aspect of the present disclosure.

Referring to FIGS. 1 and 2, a machine 100 is shown. The machine 100 may be a dozer machine 104 or a track type tractor 108. Aspects of the present disclosure may be suitably applied to a variety of other machines, such as agricultural machines, including wheeled tractors, harvesting machines, mining machines that function to rip an underlying surface or soil, and the like. The machine 100 may include a frame 112, an operator station 116 supported on the frame 112, a tracked undercarriage 120 to support and provide traction and mobility to the machine 100 over a ground surface 124, an implement 128, and a ripper assembly 132. The present disclosure may include references, such as 'soil', 'underlying surface', and the like, interchangeably used with the reference 'ground surface'.

The frame 112 may include a rigid structure to which nearly every other component (and/or sub-component) of the machine 100 may be coupled to. The frame 112 may define a front end 136 and a rear end 140. The terms 'front' and 'rear', as used herein, are in relation to an exemplary direction of travel of the machine, as represented by arrow, T, in FIG. 1, with said direction of travel being exemplarily defined from the rear end 140 towards the front end 136. A movement of the machine 100 (e.g., by way of powering the tracked undercarriage 120) may be facilitated by a power source, such as an internal combustion engine (not shown), housed in a power compartment of the machine 100.

The implement 128 may be coupled to the front end 136 of the frame 112, so as to engage and/or receive and push material during a travel of the machine 100 in the direction represented by the arrow, T. In some embodiments, the implement 128 may be movable relative to the frame 112 of the machine 100 to assume a variety of the positions relative to the ground surface 124 and perform various operations on the ground surface, although, in some cases, the implement 128 may be deployed in a fixed state relative to the frame 112. The implement 128 may include a blade, as shown, although the implement 128 may be representative of various other tools, such as buckets, material pushers, grapples, moldboards, etc., and accordingly, it may be noted that the implement 128, as discussed and depicted in the present disclosure, is purely exemplary. In some embodiments, the implement 128 may be altogether omitted from the machine.

Figure 6:
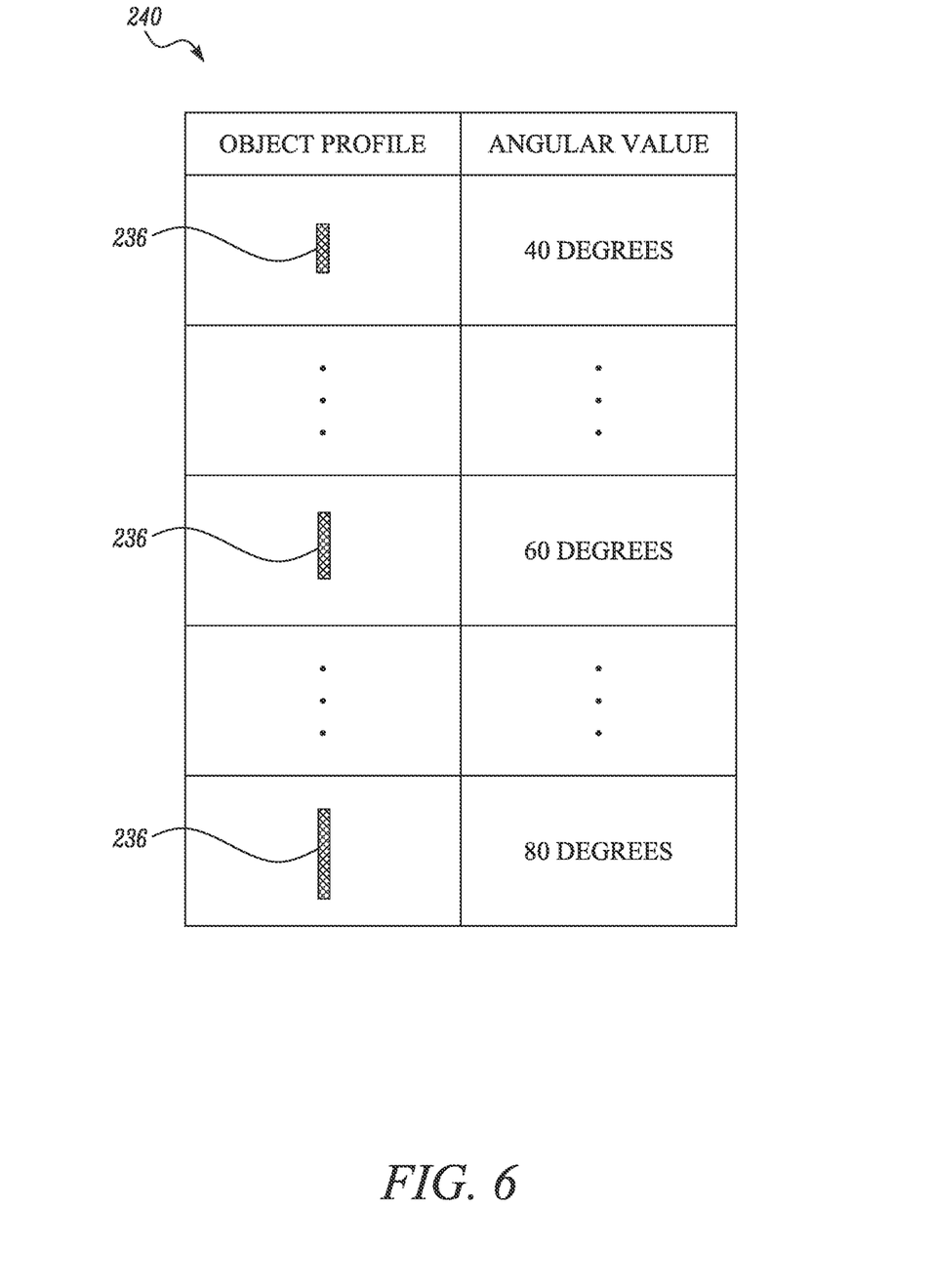
FIG. 6 is an exemplary map table that is applied to determine the angle of the ripper blade, in accordance with an aspect of the present disclosure.

The operator station 116 may be used to station one or more operators of the machine 100. Further, the operator station 116 may include one or more input devices (e.g., joystick, levers, touchscreens, control panels) (e.g., input device 144, FIG. 6). An access to the input device 144 may allow the operators to control one or more functions of the machine 100—e.g., a travel of the machine 100 along direction, T, or an actuation of the implement 128, actuation of the ripper assembly 132, etc. In some embodiments, the input device 144 may also represent or embody an input device that may be accessible by operators stationed remotely from the machine 100 (e.g., at a central server station). According to one or more aspects of the present disclosure, an operator of the machine 100 may access and/or activate the input device 144 to issue an input command to deploy the ripper assembly 132 to an operational position.

The ripper assembly 132 may be coupled to the rear end 140 of the frame 112, and may be adapted to alter the ground surface 124 during a travel of the machine 100 along direction, T. To this end, the ripper assembly 132 includes an articulation mechanism 148 and a ripper unit 152. The ripper unit 152 in turn includes a ripper shank 156 and a ripper carriage 160 for supporting the ripper shank 156, as shown in FIGS. 1 and 2. The ripper shank 156 may include a shank portion 208 defining a tip (or a shank tip 212).

The articulation mechanism 148 is configured to movably couple the ripper unit 152 to the frame 112 (i.e., to the rear end 140 of the frame 112) and is configured to facilitate a movement of the ripper shank 156 along a height, H, of the machine 100. The articulation mechanism 148 includes a ripper frame 164 that includes an end 168 which is pivotably coupled to the rear end 140 of the frame 112. The ripper frame 164 includes another end 172 disposed remotely and away from the end 168 or the frame 112. The end 172 of the ripper frame 164 is pivotably coupled to the ripper unit 152. Further, the articulation mechanism 148 includes a pair of first actuators 176 and a pair of second actuators 180, each working on hydraulic actuation principles having a cylinder-rod based arrangement—where the rod of said actuators may be extended and retracted with respect to the cylinder of said actuators based on an influx/release of fluid into/from the cylinder.

Cylinders 184 of the first actuators 176 may be coupled (e.g., pivotably) to the rear end 140 of the frame 112. Further, rods 188 of the first actuators 176 may be coupled (e.g., pivotably) to the ripper unit 152. Cylinders 192 of the second actuators 180 may also be coupled (pivotably) to the rear end 140 of the frame 112 but may be positioned below the first actuators 176 when viewed along the height, H. Further, rods 196 of the second actuators 180 may be coupled to a section 200 of the ripper frame 164. The rods 188, 196 of both the first actuators 176 and the second actuators 180 may be telescopically extendable and retractable with respect to their respective cylinders 184, 192. An extension and/or retraction of the rods 188 (e.g., synchronously) of the first actuators 176 with respect to their cylinders 184 may cause the ripper unit 152 to execute a swivelling movement with respect to the ripper frame 164 and alter an angle of the ripper unit 152 and the shank tip 212 with respect to the horizontal, HL. An extension and/or retraction of the rods 196 (e.g., synchronously) of the second actuators 180 with respect to their respective cylinders 192 may cause the ripper unit 152, the ripper shank 156, and the shank tip 212, to be lowered towards the ground surface 124 or be raised away from the ground surface 124.

Operational positions of the ripper assembly 132 have been exemplarily depicted in FIGS. 1 and 2. As may be noted, in the operational positions of the ripper assembly 132 in FIGS. 1 and 2, the rods 196 of the second actuators 180 are in an extended state with respect to their respective cylinders 192. However, the rods 188 of the first actuators 176 are in an extended state in FIG. 1 and said rods 188 of the first actuators 176 are in a retracted state in FIG. 2. When the rods 188 of the first actuators 176 are in the extended state (i.e., configuration of FIG. 1), the shank tip 212 defines an angle, A, (e.g., 40 degrees) with respect to the horizontal, HL, while when the rods 188 of the first actuators 176 are in the retracted state (i.e., configuration of FIG. 2), the shank tip 212 defines an angle, B, (e.g., 80 degrees) with respect to the horizontal, HL. During operation of the machine 100, rods 188 may assume any position between the extended position and the retracted position, in turn allowing the ripper shank 156 or the shank tip 212 to correspondingly assume any number of configurations or angular positions between the angles, A and B, by which an angle of attack of the shank tip 212 with respect to the ground surface 124 may be varied.

The shank tip 212 may ingress and enter into the ground surface 124 to alter the ground surface 124 during a movement of the machine 100 along direction, T. Outwardly, therefore, sections of the shank portion 208, such as the shank tip 212, may not be visible during operation. The shank portion 208 may extend from the shank tip 212. The shank portion 208 may be supported and coupled to the ripper carriage 160. The ripper carriage 160 may be in turn coupled (e.g., pivotably) to the rods 188 of the first actuators 176 and the ripper frame 164. Sections of the shank portion 208 may be disposed out of the ground surface 124 and thus may be visible outwardly of the ground surface 124, during operation.

Figure 3:
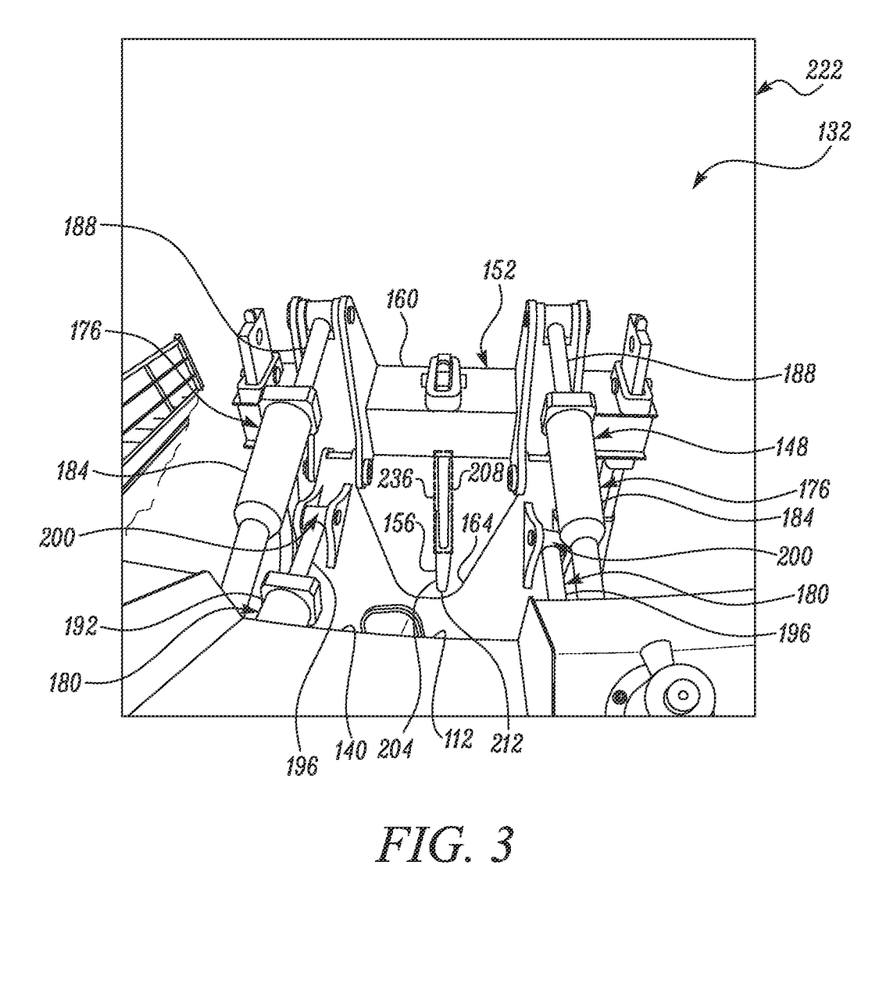
FIGS. 3 and 4 are video feed instants, captured by an image capturing device, that include visuals of the ripper assembly in one or more of the aforesaid operational positions, in accordance with an aspect of the present disclosure.
Figure 4:
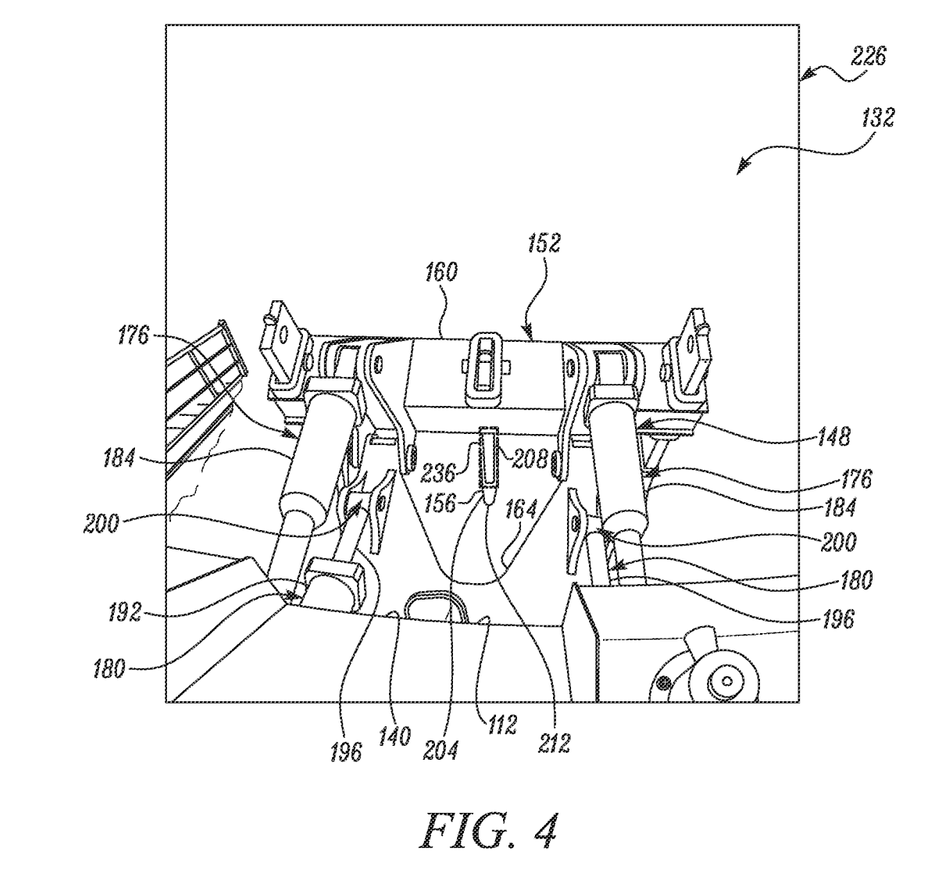
Figure 5:
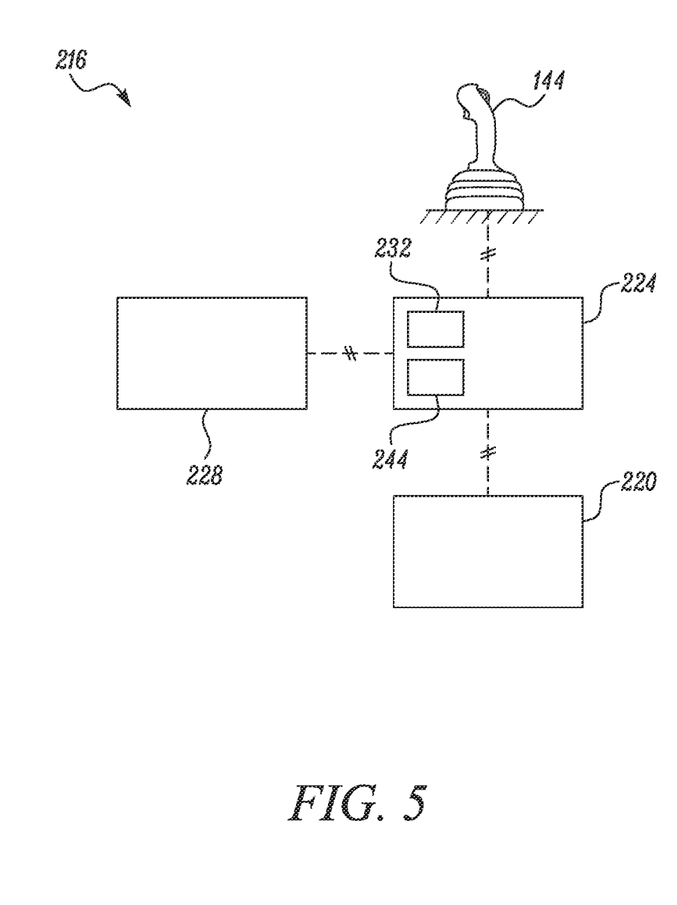
FIG. 5 is a system to determine an angle of the ripper blade, in accordance with an aspect of the present disclosure.

Referring to FIG. 5, and also in conjunction with FIGS. 1-4, a system 216 to determine the angle of the shank tip 212 is discussed. The system 216 includes an image capturing device 220 and a controller 224.

The image capturing device 220 may include a camera. The image capturing device 220 may be mounted (e.g., fixedly) on the machine 100, e.g., to a rear side of the operator station 116, as shown, or to the rear end 140 of the frame 112 of the machine 100. The image capturing device 220 may be configured to capture a video feed of an environment in the vicinity of the rear end 140 of the machine 100, e.g., a trailing portion of the machine 100. As an example, such a video feed of the trailing portion, as captured by the image capturing device 220, at any given point, may include visuals of the ripper assembly 132 and an environment (including portions of the ground surface 124) that may surround the ripper assembly 132.

FIGS. 3 and 4 exemplarily and correspondingly illustrate video feed instants captured by the image capturing device 220. These video feed instants may be part of the overall video feed configured to be captured by the image capturing device 220. FIG. 3, for example, provides a video feed instant 222 of the trailing portion of the machine 100 at an exemplary point where the shank tip 212 is at angle, A, i.e., exemplarily at 40 degrees to the horizontal, HL, while FIG. 4, for example, provides a video feed instant 226 of the trailing portion of the machine 100 at another exemplary point where the shank tip 212 is at angle, B, i.e., exemplarily at 80 degrees to the horizontal, HL.

Notably, as the video feed instants 222, 226 provided in FIGS. 3 and 4 are viewed together, the profile of the ripper shank 156 (e.g., the shank portion 208) and/or one or more components, movable with the movement of the ripper blade (e.g., the rods 188 of the first actuators 176 causing the swivelling movement of the ripper shank 156), may be viewed to have changed. For example, the shank portion 208 appears to have shrunk or contracted in profile in the video feed instant 226 of FIG. 4 as compared to its profile in the video feed instant 222 of FIG. 3. This is because as an immovable camera (e.g., the image capturing device 220) captures a moving component (e.g., the ripper shank 156) according to a fixed frame or a fixed field of view, a profile of the moving component may change from the perspective of the camera.

The controller 224 may be communicably coupled to the input device 144 and to the image capturing device 220. With the communicable coupling between the controller 224 and the input device 144, the controller 224 may be configured to receive the input command generated by the input device 144. In response to the receipt of the input command, the controller 224 may retrieve a set of instructions (e.g., from a memory 228, see FIG. 5) to run the set of instructions. According to one embodiment, running of the set of instructions enables the controller 224 to execute a method for determining an angle of the shank tip 212 (e.g., with respect to the horizontal, HL). For the purpose of determining the angle of the shank tip 212, the controller 224 may first estimate the angle of the shank tip 212 based on the input command and then use data from the image capturing device 220 to either confirm that the estimated angle is accurate or arrive at an actual angle of the shank tip 212. The actual angle, as determined by the controller 224, may vary (e.g., minimally) from the estimated angle.

For estimating the angle of the shank tip 212, the controller 224 may use one or more parameters associated with the input command. For example, the controller 224 may determine the duration for which the input command is received by the controller 224 and/or the duration for which the input device 144 is kept activated, e.g., for how long a corresponding key or a button associated with the input device 144 is pressed or kept activated, to bring about a change in the angle of the shank tip 212. Based on the duration, the controller 224 may correspondingly estimate the angle of the shank tip 212. As an example, higher the duration, proportionally higher may be the change in the angle of the ripper shank 156 (e.g., from an initial angle) with respect to the horizontal, HL. Additionally, or optionally, the controller 224 may determine a measure of power or current that is generated and/or passed in response to the activation of the input command to correspondingly estimate the angle of the shank tip 212. As an example, higher the measure of the current, proportionally higher may be the change in the angle of the shank tip 212 (e.g., from the initial angle) with respect to the horizontal, HL.

For arriving at the actual angle of the ripper shank 156, the controller 224 may acquire the video feed from the image capturing device 220. Once the video feed is received and/or acquired by the controller 224, the controller 224 (or an image analyzing module 232 associated with the controller 224) may be configured to process the video feed. In some embodiments, processing the video feed may include detecting objects in the video feed. Objects in the video feed may correspond to one or more of the ripper shank 156, portions of the articulation mechanism 148, such as rods and cylinders of the first actuators 176 and the second actuators 180, and various other parts or portions of the ripper assembly 132. Further, the controller 224 may be configured to identify at least one object (e.g., see object 236) from the many objects in the video feed. Based on the profile of such an object, the controller 224 may determine the angle (i.e., the actual angle) of the shank tip 212 with respect to the horizontal, HL.

In one embodiment, the object may be a visual of the ripper shank 156 itself as it appears in the video feed. Alternatively, the object may be a visual of the shank portion 208 (or a section of the shank portion 208) of the ripper shank 156 as it appears in the video feed—since during operation, the shank tip 212 may be under the ground surface 124 and only the shank portion 208 (or a section of the shank portion 208) may be largely visible outwardly to the ground surface 124—this object is the object 236 annotated in FIGS. 3 and 4. In such a case, the contracted profile of the visual of the shank portion 208 as it appears in the video feed instant 226 of FIG. 4 may indicate the angle, B, of the shank tip 212 (at least at that instant). Conversely, the enlarged profile of the visual of the shank portion 208 in the video feed instant 222 of in FIG. 3 may indicate the angle, A, of the shank tip 212 (at least at that instant). Any angle attained by the shank tip 212 intermittently (i.e., between angle, A, and angle, B) may also be thus determined by the controller 224.

In this regard, the memory 228 may store a map table 240 that may be retrievable by the controller 224. The map table 240 may include numerous angular values corresponding to numerous profiles of the object 236 (i.e., the visuals of shank portion 208 in the video feed). The numerous profiles of the object 236 may correspond to the many profiles attained by the shank portion 208 during the movement of the ripper shank 156 (i.e., the shank tip 212) between the angle, A, and angle, B, and as the same is viewed from the perspective of the image capturing device 220. In some embodiments, said profiles of the object 236 (i.e., the visuals of shank portion 208 in the video feed) may be obtained discretely so that corresponding angular values may be assigned against those discrete profiles and the same may be stored within the memory 228. The controller 224 may then co-relate the profile of the object 236 (i.e., the visuals of shank portion 208 in the video feed) to an angular value in the map table 240 and may set the angular value, as obtained by the co-relation, to be an actual angle of the shank tip 212. Said setting by the controller 224 may be over (i.e., to overrule) the angle of the ripper shank 156 estimated based on the input command, so as to arrive at the actual angle of the shank tip 212.

In some embodiments, the controller 224 may optionally or additionally also detect other objects such as one or more components movable with a movement of the ripper shank 156 to determine the angle of the shank tip 212. As an example, the controller 224 may identify visuals of the rods 188 of the first actuators 176 that move (e.g., extend and retract) with the movement (e.g., swiveling movement) of the ripper shank 156 and may process these visual of the rods 188 as the object(s). For example, the extended state of the rods 188 of the first actuators 176 may indicate the angle, A, of the shank tip 212. Conversely, the retracted state of the rods 188 of the first actuators 176 may indicate the angle, B, of the shank tip 212. A map table, similar to the map table 240, may be used in such a case by the controller 224. Such a map table may include numerous profiles of such object(s) against corresponding angular values. For the purposes of the present disclosure, however, it will be assumed that the controller 224 identifies the object 236 (i.e., the visual of the shank portion 208 in the video feed) to determine and arrive at the actual angle of the shank tip 212.

In some embodiments, the image capturing device 220 may be a part of an image capturing system (not shown) that includes multiple image capturing devices, similar to the image capturing device 220, that provide multiple video feeds around the machine 100. For example, such multiple image capturing devices may be positioned at specific locations on one or more outer panels of the machine 100 so as to capture video feeds of a surrounding environment around the machine 100. Video feeds from one or more such image capturing devices may be stitched together (e.g., by any control system, processor, or by the controller 224 itself) to create a single video feed. In such a case, the controller 224 may acquire and/or process such a video feed and may run the set of instructions as discussed above to determine and arrive at the actual angle of the ripper shank 156.

In some embodiments, machine learning may be applied on one or more images captured through the video feed. In this regard, the controller 224 may be trained to recognize the shank portion 208 (and/or sections of the shank portion 208) and where the shank portion 208 (and/or sections of the shank portion 208 along with the shank tip 212) is positioned. When training, one or more position sensors, e.g., that detect orientation or angle, such as inclinometers, may be mounted onto the ripper unit 152, e.g., onto the ripper carriage 160, and a video feed and/or images from the image capturing device 220 may be then retrieved, combined, and co-related, with actual positions of the shank portion 208, as detected by such sensors. Once the training is complete, such sensors may be removed from the ripper unit 152. In some cases, data from such an exercise may be then used to populate the map table 240, discussed above.

The controller 224 may be connected to the machine's electronic control module (ECM) (not shown), such as a safety module or a dynamics module, or may be configured as a stand-alone entity. Optionally, the controller 224 may be integral and be one and the same as an ECM of the machine 100. More particularly, the controller 224 may be a microprocessor-based device, and/or may be envisioned as an application-specific integrated circuit, or other logic devices, which provide controller functionality, and such devices being known to those with ordinary skill in the art. In one example, it is possible for the controller 224 to include or be representative of one or more controllers having separate or integrally configured processing units to process a variety of data (or input). Further, the controller 224 may be optimally suited for accommodation within certain machine panels or portions from where the controller 224 may remain accessible for ease of use, service, calibration, and repairs. The controller 224 may be either hard-wired or coupled wirelessly to each of the image capturing device 220 and the input device 144, noted above.

Processing units 244 applied within the controller 224 to convert and/or process the signals from the input device 144, image capturing device 220, etc., may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Examples of the memory 228 may include a hard disk drive (HDD), and a secure digital (SD) card. Further, the memory 228 may include non-volatile/volatile memory units such as a random-access memory (RAM)/a read only memory (ROM), which include associated input and output buses. The memory 228 may be configured to store the set of instruction that may be executable by the controller 224 to determine the angle of the shank tip 212.

INDUSTRIAL APPLICABILITY

Figure 7:
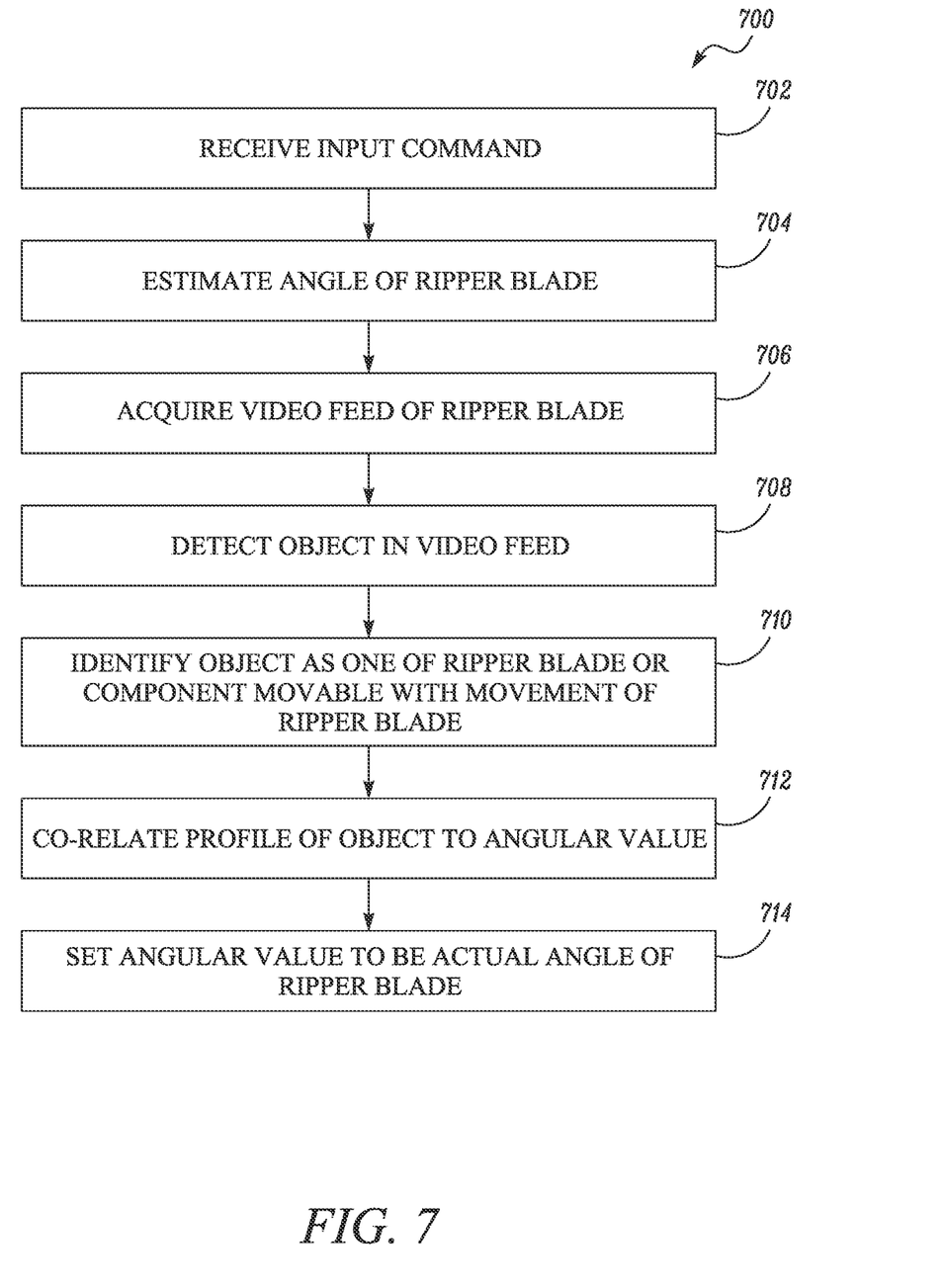
FIG. 7 is an exemplary flowchart that illustrates a method to determine an angle of the ripper blade, in accordance with an aspect of the present disclosure.

Referring to FIG. 7, a method for determining an angle of the shank tip 212 is discussed. Said method is illustrated and discussed by way of a flowchart 700, as is shown in FIG. 7. Said method is discussed also in conjunction with FIGS. 1-6 and may be understood to also relate to the system 216. The method starts at step 702.

At step 702, the controller 224 receives the input command from the input device 144. The input command may be generated as an operator accesses and activates the input device 144 so as to set the shank tip 212 at an orientation or angle which defines an angle of attack of the shank tip 212 suitable to rip and alter the ground surface 124. The method proceeds to step 704.

At step 704, the controller 224 retrieves the set of instruction from the memory 228 and runs the set of instruction. Accordingly, the controller 224 estimates the angle of the shank tip 212 based on the input command. As discussed above, the controller 224 may use one or more parameters associated with the input command to estimate the angle of the shank tip 212—i.e., the controller 224 may determine the duration for which the input command is received by the controller 224 and/or may determine a measure of power and/or current that is produced or passed in response to the activation of the input command such that a corresponding angle of the shank tip 212 may be estimated. The method proceeds to step 706.

At step 706, the controller 224, in response to the input command, acquires a video feed of the ripper shank 156 captured by the image capturing device 220. The method proceeds to step 708.

At step 708, the controller 224 detects one or more objects in the video feed. According to some embodiments, each object of the many objects in the video feed may be represented in a digitized format, such as by way of a set of pixels. The set of pixels may allow the controller 224 to cluster every object identified in the video feed. For example, the controller 224 may cluster every object based on its color as it appears in the video feed, and may also correspondingly determine the profile of each object identified in the video feed by filtering out and/or extrapolating the outlines of the objects by way of their corresponding colors. Such a process also includes the controller 224 clustering a set of pixels corresponding to the object 236 based on its color and also includes the controller 224 determining the profile of the object 236. The method proceeds to step 710.

At step 710, once the color and the profile of the object 236 is determined, the controller 224 may identify the object 236 as the ripper shank 156 (i.e., the shank portion 208 of the ripper shank 156) based on a match of the color of the object 236 to a predefined color and a match of the profile of the object 236 to a predefined profile. In some embodiments, such a predefined color and such a predefined profile may be provided in suitable charts or maps that helps determine an object based on its color and profile. Such maps or charts may be prestored in the memory 228 or may be provided in the map table 240 itself. The method proceeds to step 712.

At step 712, the controller 224 retrieves the map table 240 from the memory 228 and co-relates the profile of the object 236 to an angular value as may be provided in the map table 240. The method proceeds to step 714.

At step 714, the controller 224 sets the angular value obtained by co-relating the profile of the object 236 in the map table 240 to be an actual angle of the shank tip 212 over (e.g., overruling) the angle of the shank tip 212 estimated based on the input command. In some embodiments, the controller 224 may compare the angle of the shank tip 212 estimated based on the input command to the actual angle. If there exists a difference that is within a difference threshold, the controller 224 may then confirm that the angle of the shank tip 212 estimated based on the input command is accurate. Conversely, if the difference is beyond the difference threshold, the controller 224 may overrule the angle of the shank tip 212 estimated based on the input command and may set the angular value obtained by co-relating the profile of the object 236 in the map table 240 to be the actual angle of the shank tip 212. The method ends at step 714.

The system 216 and method as discussed above by way of the flowchart 700 provides a mechanism that allows the angle of the shank tip 212 to be deduced and confirmed in two steps, i.e., a first step that includes estimating the angle by use of one or more parameters associated with the input command, and a second step that includes the processing of the video feed.

If the visibility around the machine 100 is relatively low (e.g., because of mist, dust, etc.), the video feed as acquired by the controller 224 may be largely unreliable. In such a case, the system 216 may rely (e.g., solely) on the first step to arrive at the angle of the shank tip 212. Conversely, on occasions where the visibility around the machine 100 is relatively better, the system 216 may arrive at the angle of the shank tip 212 by performing both the first step and the second step, with the second step either confirming or correcting the deduction (of the angle of the shank tip 212) of the first step.

The two-step process provides an effective alternative to conventional ripper blade angle determination systems as it does not require sensors (e.g., physical sensors) to be located on components (e.g., on the ripper carriage 160) of the machine 100 that may undergo relatively heavy vibrations during operation. Thus, such a system and method provides a non-contact way to determine the angle of the shank tip 212, obviating sensor mispositions and damages, in turn preventing undue machine downtime, saving maintenance costs, and enhancing the machine's overall productivity.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A method for determining an angle of a tip of a ripper shank in a dozer machine, the method comprising:
   receiving, by a controller, an input command;
   estimating, by the controller, the angle of the tip based on one or more parameters of the input command;
   acquiring, by the controller, a video feed of the ripper shank captured by one or more image capturing devices in response to the input command;
   detecting, by the controller, one or more objects in the video feed;
   identifying, by the controller, at least one object of the one or more objects as one of the ripper shank or a component movable with a movement of the ripper shank based on a match of a color of the at least one object to a predefined color and a match of a profile of the at least one object to a predefined profile;
   co-relating, by the controller, the profile to an angular value in a map table, the map table including a plurality of angular values corresponding to a plurality of profiles of the at least one object; and
   setting, by the controller, the angular value obtained by co-relating the profile in the map table to be an actual angle of the tip over the angle of the tip estimated based on the input command.

* * * * *